(12) United States Patent
Shin (10) Patent No.: US 6,734,574 B2
(45) Date of Patent: May 11, 2004

(54) BUOYANCY-DRIVEN ELECTRIC POWER GENERATOR

(76) Inventor: Ernest Eun Ho Shin, 31 Skipping Rock Way, Napa, CA (US) 94558

( * ) Notice: Subject to any disclaimer, the term of this patent is extended or adjusted under 35 U.S.C. 154(b) by 0 days.

(21) Appl. No.: 10/075,010

(22) Filed: Feb. 13, 2002

(65) Prior Publication Data

US 2003/0151258 A1 Aug. 14, 2003

(51) Int. Cl.⁷ .............................................. H02N 11/00
(52) U.S. Cl. ........................ 290/1 R; 290/54; 310/10; 310/152
(58) Field of Search ........................ 290/1 R, 53, 54, 290/42–43; 405/60, 75, 96; 418/33; 60/325, 370; 417/410.11, 411; 310/10–11, 152

(56) References Cited

U.S. PATENT DOCUMENTS

| | | | | |
|---|---|---|---|---|
| 3,496,871 A | * | 2/1970 | Stengel | 417/410.1 |
| 3,847,502 A | * | 11/1974 | Isbell | 415/92 |
| 3,859,789 A | * | 1/1975 | Fawcett et al. | 60/325 |
| 3,927,329 A | * | 12/1975 | Fawcett et al. | 290/1 R |
| 4,321,020 A | * | 3/1982 | Mittal | 417/320 |
| 4,381,181 A | | 4/1983 | Clegg | 417/423.7 |
| 4,484,082 A | * | 11/1984 | Bucknam | 290/1 R |
| 4,572,561 A | | 2/1986 | Hale | 294/65.5 |
| 4,718,232 A | * | 1/1988 | Willmouth | 60/495 |
| 5,001,357 A | * | 3/1991 | Adams | 290/1 R |
| 5,944,480 A | * | 8/1999 | Forrest | 415/5 |
| 6,249,057 B1 | | 6/2001 | Lehet | 290/1 R |

* cited by examiner

Primary Examiner—Burton Mullins
(74) Attorney, Agent, or Firm—Brinks Hofer Gilson & Lione (57) ABSTRACT

A Buoyancy-Driven System for generating electric power is disclosed. The Buoyancy-Driven System utilizes Archimedes' Principle to drive magnet capsules through a fluid-filled portion of pipe and gravity to return the magnet capsules. As the magnet capsules pass through coil modules, electric power is generated.

19 Claims, 6 Drawing Sheets

BUOYANCY-DRIVEN ELECTRIC POWER GENERATOR

BACKGROUND OF THE INVENTION

Generation of electric power is a necessary component for the operation of modern society. Alternatives to conventional electric power generation sources fueled by coal or nuclear materials continue to be explored. One of the most inexpensive and cleanest methods for generating large amounts of electric power is hydroelectric power generation. The use of hydroelectric power generation, however, is limited because it requires the availability of vast quantities of water and the feasibility of constructing a large dam to store the large amount of water. Moreover, the geological sites where the requisite conditions for hydroelectric power generation can be satisfied are few and far between. These limitations often require reliance on other means of power generation such as nuclear and fossil fuel power plants, which are expensive and environmentally unattractive.

Other sources of energy, such as wind and solar power, are environmentally clean and relatively inexpensive. However, a large-scale utilization of these sources for electric power generation is not currently in practice because of several limitations that are inherent in these methods. For example, wind power and solar energy both require a disproportionately large surface area for a large-scale operation. Further, these methods are unreliable because of their dependence on the weather conditions. Thus, it is difficult to obtain continuous generation of a large amount of electric power through wind power or solar energy.

Because of the inherent limitations of most power generation methods, it would be desirable to develop an alternative power generation method that could provide power with the benefits of hydroelectric generation, but with reduced geographical restrictions.

DEFINITIONS

Buoyancy force is a form of gravitational force. For ease of explanation, however, "gravity" or "gravitational" will be used for scenarios in which the capsule is denser than the surrounding environment. "Buoyant" or "buoyancy" will refer to scenarios in which the capsule is less dense than the surrounding environment, and thus rises upwardly. "EMF," otherwise known as electromotive force, is any voltage induced by moving a conductor across a magnetic field.

BRIEF SUMMARY OF THE INVENTION

The present invention pertains to a new method and system of electric power generation, which requires neither large amounts of water nor a large dam construction. The present invention pertains to a Buoyancy-Driven System (BDS), which uses the motion of magnet capsules through coil modules to generate electric power. Like the typical hydroelectric power system, the BDS uses gravitational energy. The BDS, however, also makes use of buoyancy force in accordance with Archimedes' Principle.

In the conventional hydroelectric power system, fast-flowing water held back by a dam turns the turbine in an electric generator. The water rushing out of the dam is under high pressure caused by the weight of the water in the reservoir. The energy utilized to turn the generator is gravitational in origin, i.e., a conversion of gravitational energy to electrical energy. The electric power is generated when the magnetic field of the rotating magnetic rotor induces an EMF in the static coil that surrounds the magnetic rotor or, conversely, that rotation of a coil in the magnetic field of a fixed magnet causes an induced EMF in the rotating coil.

The BDS uses gravitational energy, in the form of gravity and buoyancy. Instead of either the water falling in the gravitational field or the fast-flowing water under high pressure from the weight of the water in the reservoir, the BDS uses buoyancy force. In the BDS, a plurality of buoyant magnet capsules are placed in a portion of a fluid-filled area. Because the magnet capsules are buoyant in surrounding fluid, buoyancy force drives the capsules upward in the fluid. As the capsules move upward, the magnetic fields of these magnet capsules induce an EMF in a plurality of coil modules that are situated on the exterior surface of portions of the loop. The size and configuration of the coil modules on the external surface of the loop are dictated by the strength and distribution of the magnetic fields generated by the magnet capsules. The coil modules may be placed on the exterior surface of the liquid-filled portion and/or the empty portion of the loop.

The BDS utilizes a containment loop which contains a buoyancy section, a slide-and-fall section, and a capsule injector. The containment loop ensures that the magnet capsules move in a predetermined path. The buoyancy section is filled with fluid. Typically, this fluid is water. However, other liquids, such as engine oil, may be utilized. Indeed, in certain embodiments, oil may be a preferable liquid due to reduced friction. The magnet capsules rise from a lower portion to an upper portion of the buoyancy section. The momentum of the magnet capsules carries them into the slide-and-fall section. The slide-and-fall section allows gravity to return the capsule from an upper elevation to a lower elevation.

In between the bottom of the buoyancy section and gravitational section, there is a capsule injector. The capsule injector receives a magnet capsule from the low-pressure gravitational section and introduces it into the high-pressure buoyancy section. In a preferred embodiment, the capsule injector operates much like a lock in a canal. There are two gates, an entrance gate on the low pressure side and an exit gate on the high pressure side. When the entrance gate is opened, the weight of the stacked magnet capsules in the capsule waiting portion of the slide-and-fall section will push the next waiting capsule into the capsule injector. Upon entering the capsule injector, a volume of liquid equal to the volume of the capsule is displaced. The displaced liquid may exit the loop via a drainage pipe that is situated off the slide-and-fall section. The displaced liquid may be pumped to the buoyancy section in order to recycle the liquid in the BDS. Once the magnet capsule is in the capsule injector, the entrance gate is closed. Next, the exit gate is opened. The magnet capsule is now subjected to the high pressure buoyancy section. At this point, the magnet capsule will rise from the bottom to the top of the buoyancy section.

The motion of a capsule through the BDS loop generates electric power. A changing magnetic flux passing through a wire loop will induce a current in the loop. Thus, the movement of a magnet capsule through a coil module will induce a current, and generate electric power. The BDS loop operates as a continuous cycle in which the magnet capsules are driven upward via buoyancy force and taken back downward using gravity. Because buoyancy and gravitational forces drive the magnet capsules through the BDS loop, EMF may be generated in either or both of the buoyancy or gravity portions of the BDS loop by placing coil modules surrounding those portions of the BDS loop.

The BDS offers a clean method of generating power. The BDS uses gravity, which includes buoyancy force, to drive magnet capsules through the BDS loop. The only energy consumed in the BDS is through the operation of the capsule injector and, if used, a refill pump for recycling the liquid utilized. Thus, with the appropriate design characteristics, the BDS can be a self-sustaining system.

DETAILED DESCRIPTION OF THE INVENTION

The Buoyancy Driven System (BDS) generates electric power by passing a plurality of magnet capsules through any plurality of coil modules. The number of capsules and coil modules are a matter of design preference, and could conceivably include only one of each. The BDS uses the laws of induction to generate EMF. According to Faraday's Law, EMF is related to the rate of change of magnetic flux. Thus, $$e = -N\frac{d\phi}{dt}$$

where e is the induced EMF, N is the number of turns in the coil, $\Phi$ is the magnetic flux passing through the coil, and $$\frac{d\phi}{dt}$$

is the rate of change of the magnetic flux.

Both conventional hydroelectric power generation and the BDS use the well-known principles of induction to generate electric power. The conventional hydroelectric power generator uses the force of rushing water to rotate a magnet around a stator at an angular frequency. The angular movement of the magnet will generate a changing magnetic flux that, in turn, induces an EMF. In the BDS, on the other hand, buoyancy and gravitational forces act linearly on the magnet capsules. As the magnet capsules pass through the BDS loop and surrounding coil modules, EMF is generated.

Figure 1:
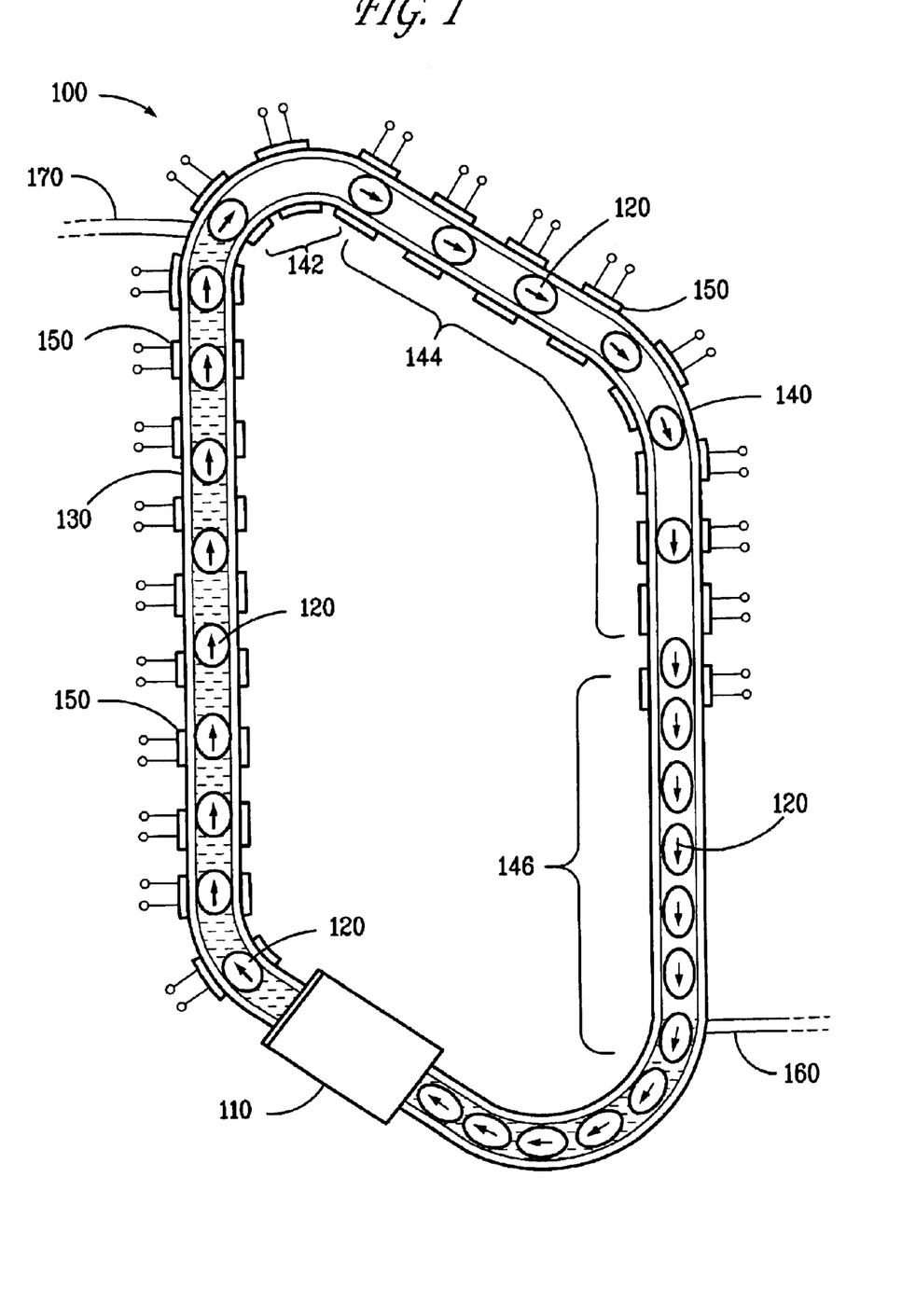
FIG. 1 is a cross-sectional view of one preferred embodiment of the BDS loop.

As shown in FIG. 1, the preferred embodiment of the BDS loop 100, also known as the containment loop 100, is preferably a closed loop of pipe. However, any other area in which a portion may be filled with liquid may be utilized. Additionally, a perforated portion of pipe submerged in a body of liquid may be used. In a preferred embodiment, the BDS loop 100 is made of a non-magnetic material, such as aluminum, PVC, or rubber. A non-magnetic material is preferable because it will have negligible effects on the magnetic fields emanating from the magnet capsules 120. In an alternative embodiment, one may determine that construction with magnetic materials is acceptable or beneficial. Additionally, it is preferable to utilize a large elevation range to increase the amount of buoyant and gravitational force acting during a cycle around the BDS loop 100. Construction on a hilltop, in the ocean, drilling into the ground, or in a tall building may all provide a large elevation range. While a large elevation range will increase the efficiency of the BDS, it is not necessary to practice the present invention.

In the preferred embodiments of the present invention, electric power is generated by the motion of magnet capsules 120 through coil modules 150. In a preferred embodiment, the coil modules 150 surround portions of the BDS loop 100. The coil modules 150 may be placed at any location on the BDS loop, internally or externally. In the presently preferred embodiments, coil modules 150 are located on the buoyancy section 130 and/or the gravitational section 140.

At the bottom of the BDS loop 100, capsule injector 110 inserts magnet capsules 120 into the buoyancy section 130 of the BDS loop 100. The buoyancy section 130 is filled with a fluid. When the magnet capsule 120 is inserted into the bottom of the buoyancy section 130, the lower density of the magnet capsule 120 will cause it to float to the top due to Archimedes' Principle. The velocity of the magnet capsule 120 is determined by the various forces acting on the capsule 120.

Figure 2:
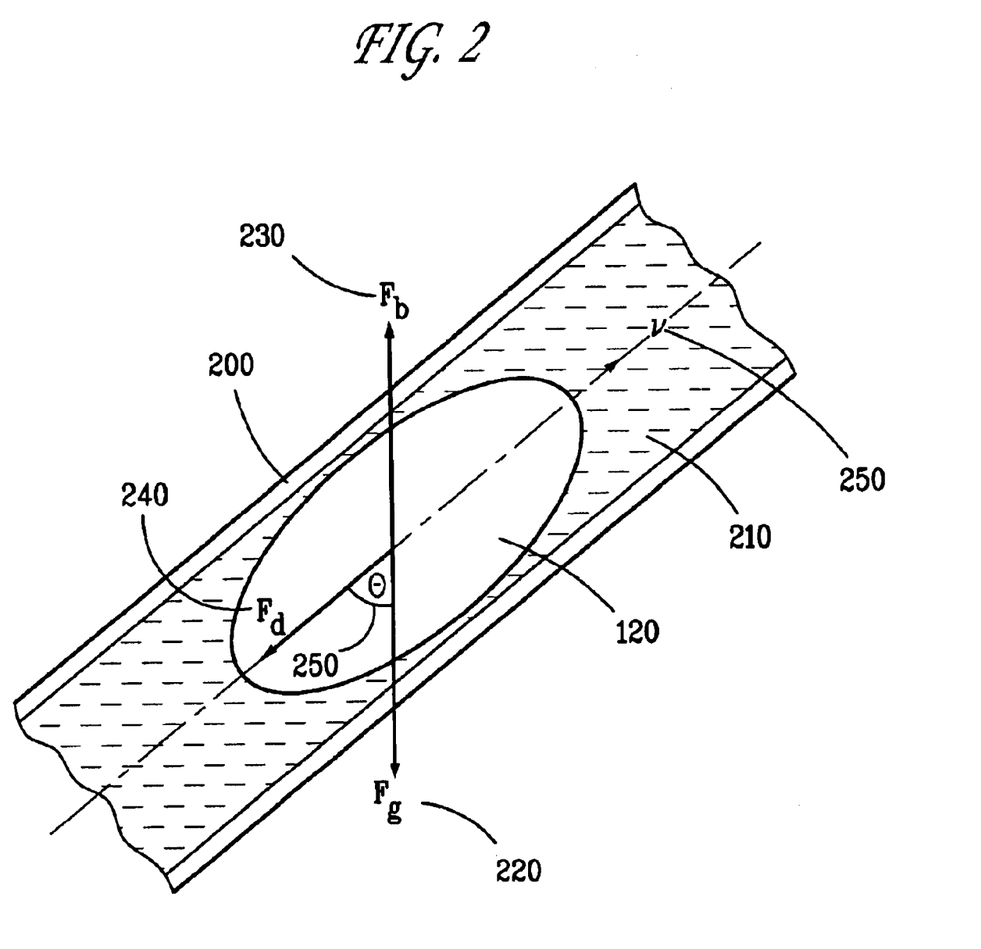
FIG. 2 is a graphical representation of the forces that act upon a buoyant magnet capsule placed in a liquid-filled portion of the loop.
Figure 3A:
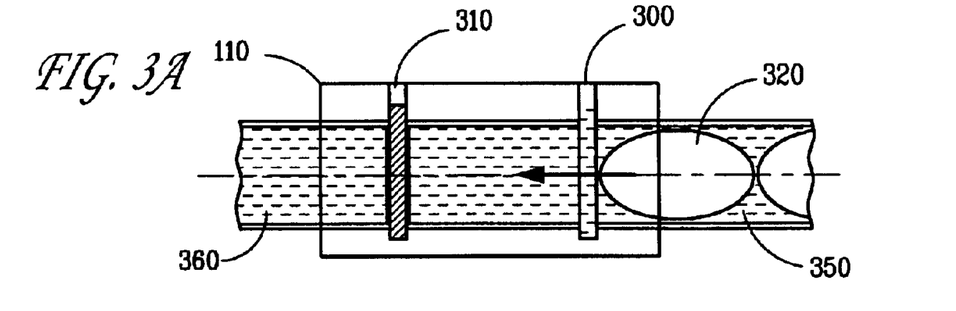
FIGS. 3(a)–(d) depict the injection of magnet capsules through an embodiment of a capsule injector for use with the present invention.
Figure 3B:
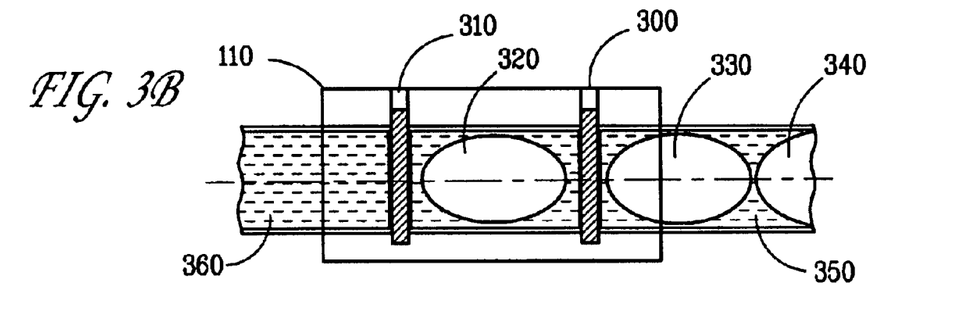
Figure 3C:
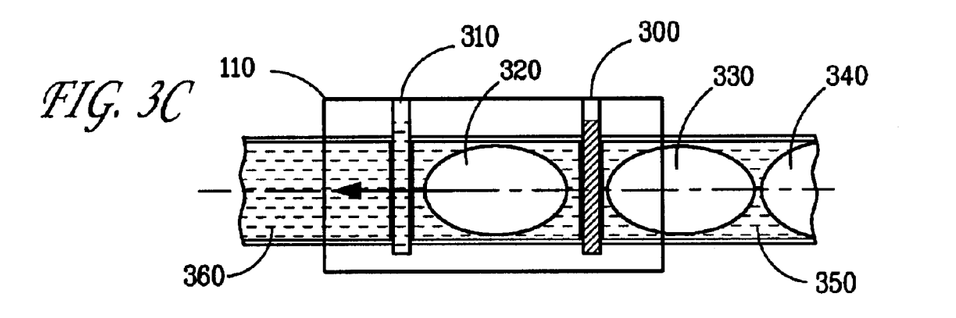
Figure 3D:
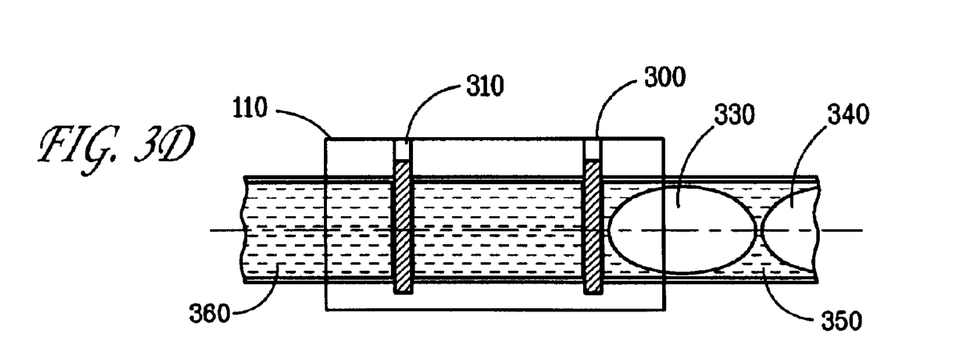

FIG. 2 shows a magnet capsule 120 placed in a portion 200 of the buoyancy section 130, which is filled with fluid 210. The capsule 120 is pulled down by a gravitational force, $F_g$, 220 and raised up by the buoyancy force, $F_b$, 230. A drag force, $F_d$, 240 also acts on the capsule 120 to slow it down as it moves through the buoyancy section 130. The capsule reaches a steady-state velocity when the opposing forces are exactly balanced. In this instance, $$(F_b - F_g) \cos \theta = F_d$$

where $\theta$ is the angle of orientation 250 of the pipeline with respect to the vertical axis along which buoyancy force 230 and gravitational force 220 lie.

According to Archimedes' Principle, the buoyancy force 230 acting on the capsule 120 is equal to the weight of the water that it displaces. This is represented by the formula:

$$F_b = \rho V g$$

where $\rho$ is the density of the liquid, V is the capsule volume, and g is gravitational acceleration.

The gravitational force 220 is represented by the equation:

$$F_g = mg$$

where m is the capsule mass and g is gravitational acceleration.

The drag force 240 is comprised of two components: a fluid drag and an inducement drag. The fluid drag is represented by the equation:

$$F_d = \eta v$$

where $\eta$ is a proportionality constant that depends on parameters characterizing the hydrodynamics of the capsule's motion such as the viscosity of the liquid and size and shape of the capsule, and v is the velocity 260 of the capsule 120.

By solving the equations, the steady state velocity 260 is determined from the fluid drag to be $$v = \frac{1}{\eta}(\rho V - m)g\cos\theta$$

for (ρV−m)>0.

In addition to velocity reduction caused by the fluid drag, intermittent velocity reductions will occur due to inducement drag. The inducement drag is created when the magnet capsule 120 is in proximity with the coil module 150. As the magnet capsule 120 passes through the coil module, the coil is magnetized in a way to oppose the magnetic field of the capsule. As a result, an EMF is induced in the coil with a polarity that opposes the field of the inducing magnet capsule. The inducement drag is proportional to the induced EMF, which is proportional to the time rate of change of the magnetic flux that passes through a coil. The time rate of change of magnetic flux is proportional to the peak strength of the magnetic field and the speed of the capsule through the coil. As the magnet capsule 120 approaches the coil module 150, the inducement drag will slow down the magnet capsule 120. Nonetheless, the buoyancy force 230, if the capsule 120 is in the buoyancy section 130; or the gravitational force 220, if the capsule 120 is in the gravitational section 140, will push the capsule 120 forward. Moreover, when the magnet capsule 120 leaves a coil module 150, the capsule will return to the steady state velocity.

If the steady state velocity is sufficient, the momentum of the magnet capsule will carry it into the buoyancy release portion 142, which meets the top of the buoyancy section 130. The buoyancy release portion 142 marks the beginning of the gravitational section 140 of the BDS loop 100.

After the momentum of the magnet capsule 120 carries it through the buoyancy release portion 142, the magnet capsule is pulled downward by gravity in the slide and fall portion 144 of the gravitational section 140 of the BDS loop 100. In a preferred embodiment, the buoyancy release portion 142 and slide and fall portion 144 of the gravitational section 140 are not filled with liquid. At the bottom of the slide-and-fall section 146, there may be a low pressure collection of liquid. The presence or absence of fluid in the gravitational section 140 is immaterial to the present invention so long as the capsule 120 is denser than its surroundings and will fall downward due to gravity. In a preferred embodiment, the slide-and-fall section 144 may be fully or partially curled into a helical shape. The use of a helical shape will increase the path length of the slide-and-fall section 144, thereby accommodating a larger number of coil modules 150 with which the capsules 120 may interact.

At the bottom of the gravitational section 140, the capsule holding section 146 holds magnet capsules 120 waiting to be placed into the capsule injector 110. Here, the collective weight of the capsules presses down on the capsules in proximity to the capsule injector 110 thereby pushing the next capsule 320 into the capsule injector 110.

Figure 6A:
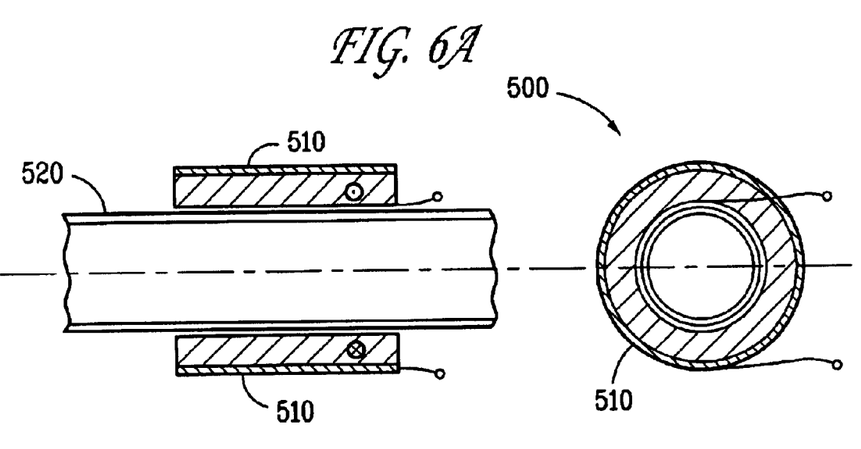
FIGS. 6(a) and (b) depict embodiments of coil modules for use with the present invention.
Figure 6B:
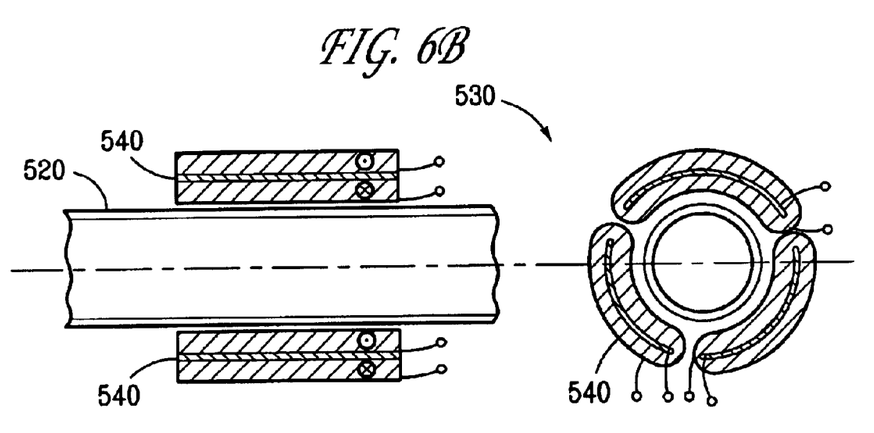

The present invention utilizes the BDS loop to generate electric power through the use of the buoyancy and/or gravitational forces. A plurality of magnet capsules 120 are less dense than the surrounding water, thus are forced upward through the buoyancy section 130 of the BDS loop 100. Surrounding the buoyancy section 130 are coil modules 150. The coil modules 150, situated on the exterior of the pipe, generate power from the magnetic flux that is induced by the upward movement of the magnet capsules 120. Embodiments of the coil modules 150 are shown in FIGS. 6(a) and (b) and described below.

The present invention uses the linear motion of a magnet through a coil to generate electricity. In this manner, electricity can be generated at any point in the BDS loop 100 where a magnet capsule 120 is moving through a coil module 150. Thus, electricity may be generated in both the buoyancy section 130 and the gravitational section 140.

In FIG. 3, the operation of a two-gate capsule injector 370 is depicted. The capsule injector 370 contains an in-gate 300 and an out-gate 310, and operates much like a lock in a canal or a torpedo tube in a submarine. As shown in FIG. 3(a), a first waiting capsule 320 resides in a low pressure body of water 350. As noted above, a different liquid may be used instead of water. Behind the first waiting capsule 320 is a second waiting capsule 330. When the in-gate 300 is opened, the weight of the other waiting capsules in the capsule holding area 146 of the BDS loop 100, pushes the first waiting capsule 320 into the "lock" portion of the capsule injector. When the in-gate is closed, as shown in FIG. 3(b), the second waiting capsule 330 takes the place of the first waiting capsule 320, which is now located in between the in-gate 300 and out-gate 310, and a third waiting capsule 340 has taken the place of the second waiting capsule 330. Next, as shown in FIG. 3(c), the out-gate 310 is opened and the capsule 320 is exposed to the high pressure body of water 360, or other liquid. FIG. 3(d) returns to the beginning of the injection cycle.

Figure 4:
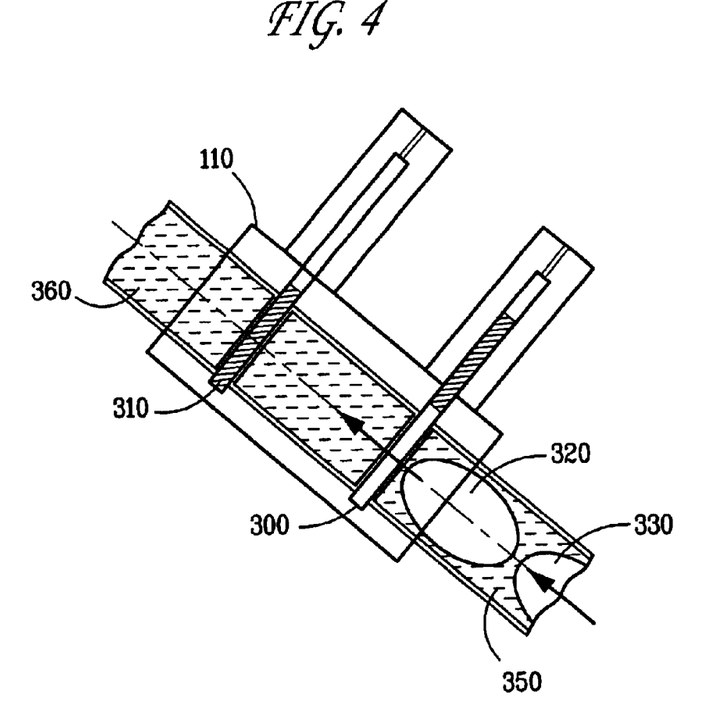
FIG. 4 depicts an embodiment of a capsule injector for use with the present invention.

As shown in FIG. 4, a preferred embodiment of the two gate capsule injector 370 is aligned such that the out-gate 310 is higher than the in-gate 300. With this alignment, the buoyancy force 230 acts immediately on the first waiting capsule 320, thereby pulling it into the buoyancy section 130 of the BDS loop 100.

The gates of the capsule injector 370 may be opened and closed in a variety of ways, including hydraulics, electromagnetics, or mechanical means. The gates may also be programmed to run automatically with a cycle period properly adjusted to a desired spacing of the capsules ascending in the buoyancy section 130. The energy produced by the BDS may also be used as a source for the operation of the capsule injector 110.

Because the water, or other liquid, is displaced to the capsule in waiting portion 146 of the BDS loop 100, a drain 160, as shown in FIG. 1, may be utilized to remove liquid from the gravitational section 140 of the BDS loop 100. A refill pipe 170 may also be used to refill the water, or other liquid, into the top of the buoyancy section 130. Further, in another embodiment, the buoyancy section 130 may be perforated to allow a surrounding body of liquid to refill the liquid displaced during capsule injection.

Figure 5:
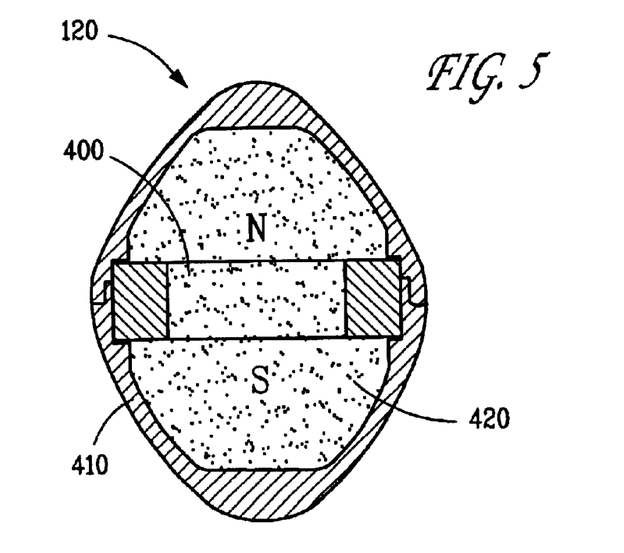
FIG. 5 depicts an embodiment of a magnet capsule for use with the present invention.

FIG. 5 depicts a magnet capsule 120 that may be used with the present invention. The capsule 120 includes a magnet 400 that is placed inside a casing 410. It is preferable to utilize a casing that is light and sturdy. For example, aluminum or fiberglass reinforced plastic may be satisfactory materials for the casing. The magnet 400 in a preferred embodiment is a permanent magnet. This magnet may be a simple bar magnet as shown in FIG. 5, a ring-shaped magnet, an arrangement of a plurality of magnets, or other type of magnet. It is preferable to utilize a permanent magnet, but electomagnets driven by batteries may also be used. The type of magnet is a matter of design choice and is not essential to the present invention. The space inside the capsule not occupied by the magnet may be left empty or filled will a light material, such as Styrofoam. The capsule 120 is designed to optimize the buoyancy force when it is in the buoyancy section 130, while allowing for sufficient gravitational force when it is in the gravitational section 140.

FIGS. 6(a) and (b) depict coil module embodiments that may be used in accordance the present invention. The coil module 150 is a coil of wire wound and mounted on the exterior surface of the BDS loop 100. The coil module 150 may be thought of as the linear version of the circular stator coil of the conventional shaft-motion generator of comparable dimensions. Likewise, the magnet capsule 120 may be thought of as the linear counterpart of the magnetic rotor of the conventional shaft-motion generator. Thus, one engagement of a magnet capsule 120 with one coil module 150 is equivalent to one turn of revolution of the conventional shaft-motion generator of comparable dimension. In a preferred embodiment, the coil module 150 is mounted along the buoyancy section 130 and slide and fall portion 144. The design of the coil module 150 is dependent on the type of magnet capsule 120 utilized and the type of accompanying electrical system for collecting and processing the electric power. As with the choice of magnet capsule or capsule injector, any one particular coil module is not essential to practice the present invention.

FIG. 6(a) shows a single coil module 500. In the single coil module 500, a ferromagnetic skin 510 is located around the exterior of the coil module 500. The single coil module 500 induces an EMF through the magnetic flux internal to the capsule magnet. FIG. 6(b) shows a compound wound coil module 530. The compound wound coil module 530 utilizes a ferromagnetic core 540 and induces an EMF through the external magnetic flux.

Figure 7:
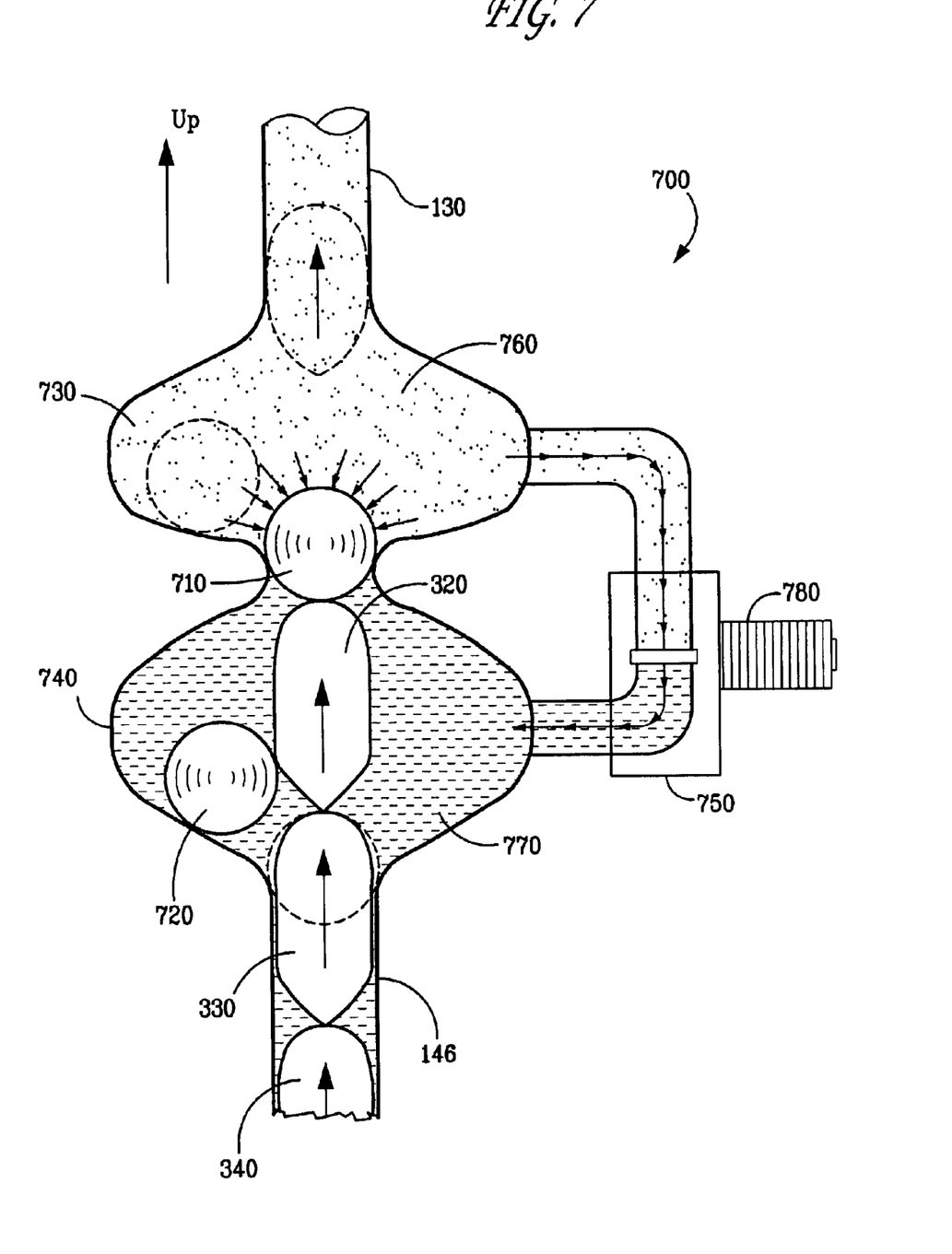
FIG. 7 depicts another embodiment of a capsule injector for use with the present invention.

Different embodiments may also be used for the capsule injector 110. FIG. 4 depicted a two-gate capsule injector 370. As shown in FIG. 7, another embodiment may utilize ball shaped stoppers. In the ball stopper embodiment 700, there is a first ball valve 710 and a second ball valve 720. The ball valves 710 and 720 have a density larger that the surrounding fluid, while the capsules 120 have a density that is smaller than the surrounding fluid. The net weight of a ball valve, which is equal to the gross weight minus the buoyancy force acting upward on the ball valve, is smaller than the net buoyancy force acting on the capsule, which is equal to the gross buoyancy force acting on the capsule minus the weight of the capsule.

The ball stopper capsule injector 700 includes a first chamber 730, second chamber 740, and an electric valve 750. When the electric valve 750 is closed, the first chamber 730 is filled with high pressure fluid 760 due to the weight of the fluid in the buoyancy section 130, while the second chamber 740 is filled with lower pressure fluid 770. The high pressure acting on the first ball valve 710 keeps it securely in place blocking the entrance of the first chamber 730, thus preventing the high pressure fluid 760 from entering the second chamber 740 and the first waiting capsule 320 from entering the first chamber 730. With the electric valve 750 closed, the second ball valve 720 is lifted and pushed aside by the first waiting capsule 320 due to the low pressure of the fluid 770 in the second chamber 750 and the capsule holding section 146.

When the electric valve 750 is opened by the activation of a solenoid 780, the pressure in the two chambers 730 and 740 equalizes so that the fluid 770 in the second chamber 740 is now at the same high pressure as the fluid 760 in the first chamber 730. Because the net weight of a ball valve is sufficiently smaller than the net buoyancy force of a capsule, the first waiting capsule 320 may now push the first ball valve 710 aside and enter the first chamber 730. The buoyancy of the first waiting capsule 320 then causes the first waiting capsule 320 to be injected into buoyancy section 130.

The second waiting capsule 330, which is only partially in the second chamber 740 is pushed down into the capsule holding section 146 when the electric valve 750 is opened. This occurs because the pressure on the front of the second waiting capsule 330 is higher than the pressure on the rear of the second waiting capsule 330. As the second waiting capsule 330 is pushed down into the capsule holding section 146, the second ball valve 720 rolls down to securely block the entrance to the second chamber 740. In this instance, the pressure difference between the second chamber 740 and the capsule holding section 146 is sufficiently large enough to push all of the capsules in the capsule holding section 146 collectively.

When the electric valve 750 is closed by deactivating the solenoid 780, the fluid in the second chamber 770 returns to the original low pressure. The pressure difference between the two chambers 730 and 740 keeps the first ball valve 710 securely in place, blocking the entrance of the first chamber 730. Because the second chamber 740 and the capsule holding section 146 are now at the same low pressure, the second waiting capsule 330 is able to push aside the second ball valve 720 and a third waiting capsule 340 partially enters the second chamber 770. At this point, the process repeats itself.

In the preferred embodiment, it is desirable to utilize a large plurality of coil modules in order to maximize the EMF generated in a given cycle. Because the size of the magnet is determined by the size and weight constraints of the capsule 120, the magnitude of the EMF that can be attained in a single coil module 150 is limited. However, with a plurality of capsules 120 and coil modules 150, at any given instant the total sum of electricity generated will be significant.

The BDS generates power by passing magnet capsules 120 through coil modules 150. The BDS may also incorporate the use of one or more additional sources of energy. For example, if the BDS loop is constructed in the ocean, BDS may additionally use the motion of the waves to generate electric power. This additional energy may be used to increase the electrical power generated and/or to operate the capsule injector 110 or the pump 170. In yet another embodiment, the BDS may additionally utilize solar energy. In a further embodiment, other sources of electrical power generation may be utilized.

The operation of the BDS may be effected by several variables including the design of the magnet capsules 120, the coil modules 150, the type of fluid utilized, and the capsule injector 110. The BDS demonstrates an improvement over the prior art by implementing a novel method and system for generating electrical power in an environmentally attractive manner.

What is claimed is:

1. A buoyancy-driven power generation system comprising:

a plurality of magnet capsules;

a containment loop, said loop comprising a buoyancy section and a gravitational section;

said buoyancy section comprising a lower elevation portion and an upper elevation portion, wherein said buoyancy section is filled with liquid;

said gravitational section comprising a capsule holding section and a slide-and-fall section;

a capsule injector operative to receive a magnet capsule from said slide-and-fall section and introduce said magnet capsule into said buoyancy section; and a coil configured to allow passage of said magnet capsules therethrough;

whereby movement of said magnet capsule through said coil generates electric power.

2. The buoyancy-driven power generation system of claim 1 wherein said capsule injector comprises a first gate and a second gate.

3. The buoyancy-driven power generation system of claim 1 wherein said capsule injector comprises a first chamber, first ball valve, second chamber, and a second ball valve.

4. A method of generating electric power, said method comprising:

introducing a magnet capsule into a first portion of a containment loop;

allowing said magnet capsule to move within said first portion due to buoyancy force; and inducing electric power through the movement of said magnet capsule through said first portion;

wherein said first portion is filled with liquid.

5. The method of generating electric power of claim 4, further comprising the act of placing said magnet capsule in a capsule injector.

6. The method of generating electric power of claim 4 wherein said capsule is moved through at least a second portion of said loop via gravity.

7. The method of generating electric power of claim 6 wherein said magnet capsule is pushed via the collective weight of a plurality of magnet capsules.

8. A method of generating electric power, said method comprising:

providing an elongated tube, said elongated tube comprising a liquid filled portion and a non-liquid filled portion;

providing at least one coil module proximate to at least one segment of said tube;

introducing a magnet capsule to said liquid filled portion;

allowing said magnet capsule to move through said liquid filled portion due to buoyancy force; and inducing electric power through the movement of said magnet capsule proximate said coil module in proximity to said a non-filled portion.

9. An apparatus for generating electric power using buoyancy, said apparatus comprising:

a containment loop;

a liquid filled portion of said loop having a lower elevation portion and a higher elevation portion;

a plurality of coil modules surrounding said liquid filled portion; and a plurality of buoyant magnet capsules operative to move from said lower elevation portion to said higher elevation portion.

10. The apparatus for generating electric power of claim 9, further comprising a substantially non-filled portion of said loop connected with said liquid filled portion of pipe.

11. The apparatus for generating electric power of claim 10 wherein said non-liquid filled portion is connected with said higher elevation portion.

12. The apparatus for generating electric power of claim 9, further comprising a capsule injector connected with said lower elevation potion.

13. The apparatus for generating electric power of claim 9, further comprising a refill pipe connected with said liquid filled portion.

14. A method of generating electric power, said method comprising:

providing at least one buoyant magnetic capsule and at least one coil;

introducing said capsule into a lower portion of a liquid-filled area;

allowing said magnetic capsule to rise through said liquid; and directing said capsule proximate said coil to induce current flow in said coil.

15. The method of claim 14 further comprising the act of returning said capsule to a lower portion via gravity.

16. The method of claim 15 further comprising the act of providing a first flowpath for said capsule through said liquid and proximate said coil.

17. The method of claim 16 wherein said flowpath further comprises a tubular member at least partially filled with a liquid.

18. The method of claim 17 further comprising the act of providing a second flowpath for said capsule to said lower portion of said liquid-filled area.

19. The method of claim 18 wherein said first and second flowpaths are connected together to form a continuous loop.

* * * * *